(12) United States Patent
Budge

(10) Patent No.: US 7,219,114 B2
(45) Date of Patent: May 15, 2007

(54) FAST APPROXIMATION TO THE SPHERICAL LINEAR INTERPOLATION FUNCTION

(75) Inventor: William Budge, Piedmont, CA (US)

(73) Assignee: Patent Purchase Manager, LLC, Los Altos, CA (US)

( * ) Notice: Subject to any disclaimer, the term of this patent is extended or adjusted under 35 U.S.C. 154(b) by 548 days.

(21) Appl. No.: 10/120,904

(22) Filed: Apr. 10, 2002

(65) Prior Publication Data

US 2003/0195907 A1 Oct. 16, 2003

(51) Int. Cl.
G06F 7/38 (2006.01)

(52) U.S. Cl. .................................................... 708/290

(58) Field of Classification Search ................ 708/300, 708/313, 290; 345/473; 709/290
See application file for complete search history.

(56) References Cited

U.S. PATENT DOCUMENTS

| | | | | |
|---|---|---|---|---|
| 4,797,836 A | * | 1/1989 | Witek et al. ................ | 345/473 |
| 5,212,480 A | * | 5/1993 | Ferro .......................... | 340/974 |
| 5,224,064 A | * | 6/1993 | Henry et al. ................ | 708/440 |
| 5,793,382 A | | 8/1998 | Yerazunis et al. | |
| 6,377,906 B1 | * | 4/2002 | Rowe .......................... | 702/151 |
| 6,628,286 B1 | * | 9/2003 | Comair et al. .............. | 345/473 |

OTHER PUBLICATIONS

Kenneth et al., Smooth Interpolation of Rotational Motions, 1988, IEEE, pp. 724-729.*
Thomas et al., Cooperating manipulator control using dual quaternion coordinates, 1994, IEEE, pp. 2417-2418.*
Myoung-Jun et al., A C2-continous B-spline Quaternion Curve Interpolating a Given Sequence of Solid Orientations, 1995, IEEE, pp. 72-81.*
Brian Martin, Quaternion Int rpolation, Jun. 1999, HTML at http://www.theory.org/software/qfa/writeup/node12.html, pp. 1-2.*
Moller et al., *Real Time Rendering*, A.K. Peters Ltd., pp. 48-49 (1999).
Press et al., *Numerical Recipes in C*, Cambridge University Press, pp. 190-208 (1992).
DeLoura, Mark A. (ed.), *Game Programming Gems*, ISBN: 1-58450-049-2, Charles River Media, Inc., pp. v-xviii and 195-218 (2000).
Foley, James D. et al. (eds)., *Computer Graphics: Principles and Practice*, ISBN: 0-201-84840-6, Addison-Wesley Publishing Company, Inc., pp. xvii-xxiii and 1057-1064 (1996).
Watt, Alan and Watt, Mark, *Advanced Animation and Rendering Techniques: Theory and Practice*, ISBN: 0-201-54412-1, ACM Press, pp. xi-xiv and 360-368 (1992).

* cited by examiner

*Primary Examiner*—Kakali Chaki
*Assistant Examiner*—Chat C. Do
(74) *Attorney, Agent, or Firm*—Sterne, Kessler, Goldstein & Fox P.L.L.C.

(57) ABSTRACT

A method for an accurate approximation to Slerp function that is much faster to compute on current processors. Specifically, the present invention provides a method for obtaining an interpolated quaternion comprising forming a first product of a first quaternion and a first scaling function; forming a second product of a second quaternion and a second scaling function; and forming a sum of the first product and the second product, wherein the first scaling function is approximated by obtaining a first polynomial and wherein the second scaling function is approximated by obtaining a second polynomial, thus obtaining an interpolated quaternion that is in between the first quaternion and the second quaternion.

14 Claims, 2 Drawing Sheets

FAST APPROXIMATION TO THE SPHERICAL LINEAR INTERPOLATION FUNCTION

BACKGROUND OF THE INVENTION

The present invention is related to interactive entertainment products for advanced entertainment systems including computer entertainment systems, game consoles, hand held gaming devices and personal computers. More particularly, the present invention is directed towards the techniques that are employed for the generation of graphics and animations in such interactive entertainment products.

A large part of what users of current interactive game engines see is the play back of computer generated animations on a display. As users have been getting more sophisticated, they tend to demand ever more realistic computer generated animations. To this end, interactive game engines strive to play back animations at variable frame rates, while smoothly transitioning from animation to animation. Interactive game engines use interpolation to transition from one image frame to another and to mix several animations at once so that the game characters respond to the user's input continuously and without delay or even immediately.

At the graphics engine level, one way of keeping track of spatially varying features, such as the game character's limb positions, etc., is by using quaternions. A quaternion is an extension to normal complex numbers, composed of a real number and a vector and depends on one real and three imaginary units. Quaternions, a generalization of complex numbers having the form a+bi+cj+dk, where, a, b, c, and d are real numbers, and where $i^2=j^2=k^2=-1$, were originally developed by the Irish mathematician, Sir William Rowan Hamilton. While interactive video games were not contemplated even by mathematical geniuses such as Sir Rowan in the 1840's, today, quaternions are commonly used in 3D graphics engines to represent rotations and orientations of coordinate axes. Using quaternions, it is possible to create smooth interpolations between two rotations. A rotation is, for example, the direction a game character or a game scene is pointing.

Qauternions have numerous advantages over other ways of representing rotations. They use less memory than matrices. Concatenation and inversion operations are fast. Conversion to other representations is also very fast. For these as well as other reasons, in an interactive game having complex characters, thousands of quaternions may be interpolated per frame.

A foundation of all these interpolations is the spherical linear interpolation (Slerp) function, which interpolates between two quaternions. The Slerp function is simple and mathematically robust, but it is a computationally expensive function. This limits its usefulness as game programmers call it (the Slerp function) only sparingly. In a complex animation engine where an abundance of blending is occurring, this function can become a computational "hot spot," where the demand for such excessive computational resources may at best only be met by relatively few rather high-end processors, and at worst not be justifiable on the most typical processors.

It has long been established that one way for the reduction of computational hot spots is to use approximations instead of the actual computation of desired functions. However, approximations generally tend to speed things up at the expense of accuracy.

There is therefore a need for an accurate approximation to the Slerp function for interpolating quaternions, that is much faster to compute on current processors.

BRIEF SUMMARY OF THE INVENTION

The present invention provides a method for an accurate approximation to the Slerp function for the interpolation of quaternions that is much faster to compute on current processors. Specifically, the present invention provides a method for obtaining an interpolated quaternion comprising forming a first product of a first quaternion and a first scaling function; forming a second product of a second quaternion and a second scaling function; and forming a sum of the first product and the second product, wherein the first scaling function is approximated by obtaining a first polynomial, and wherein the second scaling function is approximated by obtaining a second polynomial, thus obtaining an interpolated quaternion that is in between the first quaternion and the second quaternion.

In one aspect, the obtaining of the first and the second polynomials includes obtaining bivariate polynomials. More specifically, the first and second polynomials are approximations of a first and a second minimax bivariate polynomials, wherein a minimax polynomial is a polynomial of a given degree whose maximum error is the smallest.

In certain aspects, the approximations of the first and second minimax bivariate polynomials include a first and a second Chebyshev polynomial, wherein the Chebyshev polynomials are of order N, M, wherein N is less than M.

For a further understanding of the nature and advantages of the present invention, reference should be made to the following description taken in conjunction with the accompanying drawings.

DETAILED DESCRIPTION OF THE INVENTION

Figure 1:
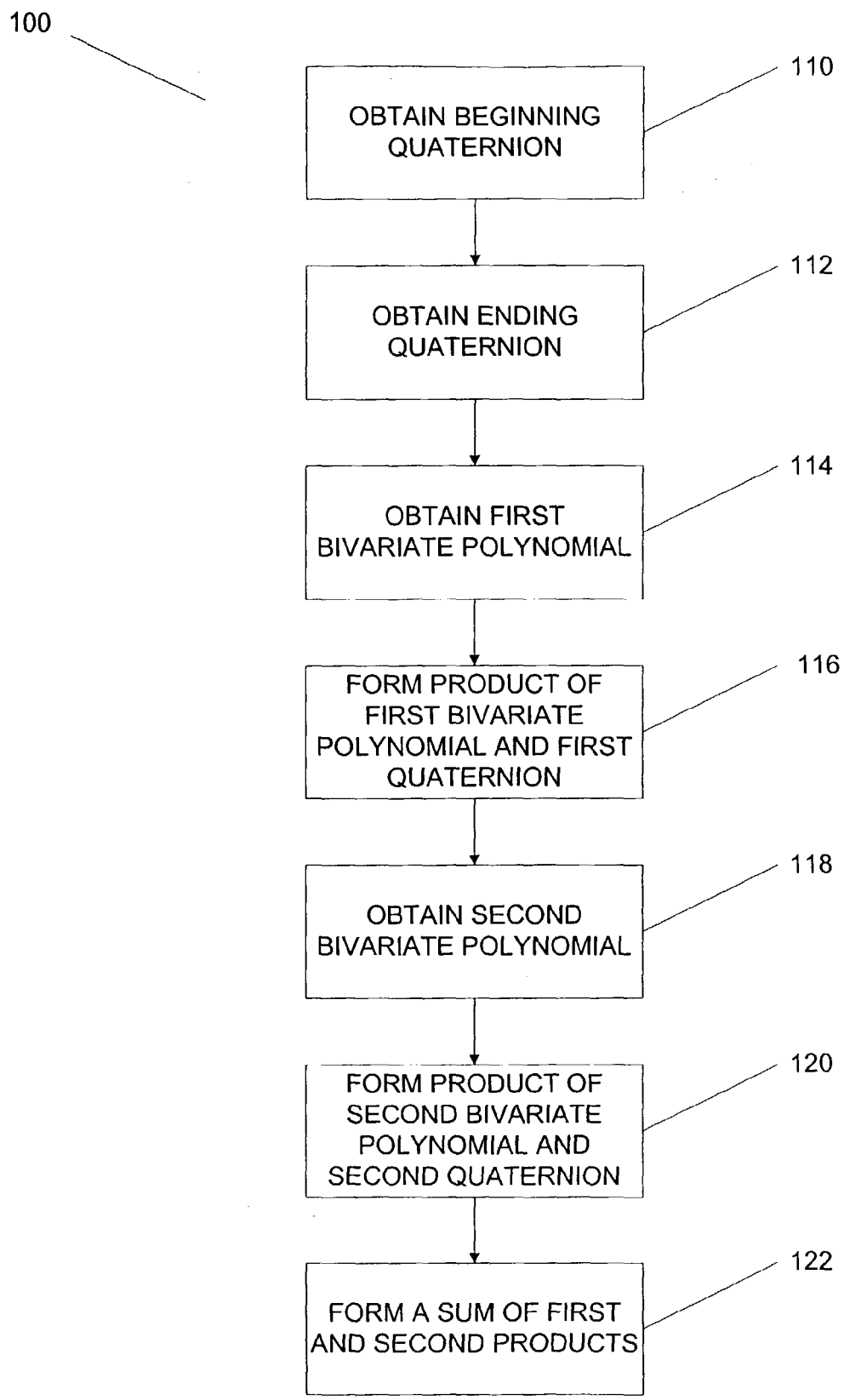
FIG. 1 is a block diagram of an embodiment of a method for obtaining an interpolated quaternion in accordance with the present invention.

Embodiments of the present invention provide a fast and accurate method for obtaining an interpolated quaternion. Before describing the methods in accordance with embodiments of the present invention, a brief introduction to the Slerp function is provided below.

The Basic Problem

At the present, a common way of obtaining a value for an interpolated quaternion is by relying on the spherical linear interpolation (Slerp) function. This function (Slerp) is generally available as a rather stock function in most commonly accessible standard math libraries. Most of the these standard libraries use the following equation, (Eqn. 1) for evaluating the Slerp function ($q_1$ and $q_2$ are the beginning and ending quaternions):

$$Slerp(q_1, q_2, t) = \frac{\sin(\phi(1-t))}{\sin(\phi)} q_1 + \frac{\sin(\phi t)}{\sin(\phi)} q_2, \quad \text{(Eqn. 1)}$$

where $\phi = \cos^{-1}(q_1 \cdot q_2)$

As can be observed, it is rather difficult to simplify this equation, because, for example, there is no convenient trigonometric identity for the (sin) of a nonintegral multiple of an angle.

Furthermore, from an algorithmic or programming perspective, converting Eqn. 1 into a computer useable code is not trivial. This conversion requires the resolution of two difficulties. First, when the quaternions are nearly equal the denominators approach zero, and numerically dealing with near zero denominators is a difficult task. One way of addressing this difficulty is to use linear interpolation. Second, because quaternions exist on a hypersphere, there are two paths between the input quaternions and thus two ways to interpolate. It is desired to interpolate along the shortest path. Even after addressing these two difficulties, an algorithmic implementation of a Slerp function is computationally very expensive (e.g. requires a disproportionate share of computational resources).

For example, for each Slerp evaluation, this method will require three calls to a (sin) function and at least one call to (acos [i.e. arc cosine]) function. Such calls to math libraries are computationally expensive. Moreover, the method does not lend itself well for the exploitation of any parallel processing, and thus the method cannot be made computationally cheaper (e.g. by parallel or vector processing). As can be seen, the (acos) function must be called before making calls to the (sin) function. Such serial processing, clearly does not enable an easy optimization (e.g. vectorizing, or parallel processing). Optimization is generally demanded in mathematically intensive processing methods to speed up computations. Faster computations allow for more quaternion interpolations, which in turn allow a more complex and thus more realistic character animations in interactive games.

Embodiments of the present invention recognize this inherent limitation of the Slerp function and provide methods that evaluate the Slerp function using a bivariate (i.e. two variables) polynomial-based approach.

The Solution: A Fast Slerp Method

FIG. 1 is a simplified block diagram 100 of an embodiment of a method for obtaining an interpolated quaternion in accordance with the present invention. In order to obtain an interpolated quaternion that is bounded by a beginning (first) and an ending (second) quaternion, the method begins by obtaining a beginning or first (step 110) and an ending or second (step 112) quaternion. Next, a first scaling function, which is approximated by a first bivariate polynomial (i.e. depend on two variables) is obtained (step 114). Next, a first product of the first quaternion and the first scaling function is obtained (step 116). Next, a second scaling function, which is approximated by a second bivariate polynomial is obtained (step 118). Next, a second product of the second quaternion and the second scaling function is obtained (step 120). Lastly, the first and second products are added together to obtain an interpolated quaternion value that is between the first and second quaternion values. The methods used to determine the scaling functions (i.e. the bivariate polynomials) are described in further detail below.

The Slerp function (i.e. Eqn. 1), works by forming a linear combination of the input quaternions ($q_1$ and $q_2$). Each quaternion is scaled and the results are added together. Embodiments of the present invention are directed towards the methods used to calculate the two scale factors. A reformulation of Eqn. 1 makes this observation more clear.

$$Slerp(q_1, q_2, t) = f_1(\phi, t)q_1 + f_2(\phi, t)q_2, \text{ where} \quad \text{(Eqn. 2)}$$

$$f_1(\phi, t) = \frac{\sin(\phi(1-t))}{\sin(\phi)},$$

$$f_2(\phi, t) = \frac{\sin(\phi t)}{\sin(\phi)},$$

and $\phi = \cos^{-1}(q_1 \cdot q_2)$

As can be seen from Eqn. 2, the scale functions ($f_1$ and $f_2$) are bivariate (i.e. take two scalar arguments) and produce a scalar result. Their arguments $t$ and $\phi$ are in the ranges [0 . . . 1] and [0 . . . $\pi$] respectively, with $t$ being a measure of a distance along the path between $q_1$ and $q_2$. As is described below, Eqn. 2 is further reformulated to also enable the polynomial approximation to also include the inverse cosine function, as this will also speed up the computation of the Slerp function.

$$Slerp(q_1, q_2, t) = f_1(c, t)q_1 + f_2(c, t)q_2, \text{ where} \quad \text{(Eqn. 3)}$$

$$f_1(c, t) = \frac{\sin(\cos^{-1}(c)(1-t))}{\sin(\cos^{-1}(c))},$$

$$f_2(c, t) = \frac{\sin(\cos^{-1}(c)t)}{\sin(\cos^{-1}(c))},$$

and $c = q_1 \cdot q_2$

The reformulation of [Eqn. 2 into (Eqn. 3)] provides a further improvement, because the arguments $c$ and $t$ are now both in the range [0 . . . 1], and that allows for a better polynomial fit for the scaling functions. A better polynomial fit is allowed because $c$ and $t$ are defined over a very convenient domain, and they are smooth and well behaved. The bivariate function (polynomial) approximation of the scale functions ($f_1$ and $f_2$) will now be described below.

One method for approximating the scaling functions is to use a table to look up the value. However, table-based methods are presently less attractive since floating point operations (e.g. computations) are relatively cheap and memory accesses (e.g. table look-ups) are relatively more expensive. Furthermore, the table look-up or memory access approach could potentially be more expensive, since the approximations involve functions of two variables, and thus require the tables be two dimensional and therefore much larger.

A preferred method for approximating the scaling functions $f(x)$ is by evaluating a polynomial, which is typically written as a sum of monomials:

$$f(x) \approx P(x) = \sum_{i=0}^{N-1} c_i x^i \quad \text{(Eqn. 4)}$$

where $f(x)$ is the scaling function and $P(x)$ is the polynomial approximation thereto.

It should be noted that the polynomial of Eqn. 4 is a univariate (i.e. depends on one variable), and is used for illustration purposes only. The description below is further expanded to describe the bivariate polynomial approximation. In a polynomial, The degree N of the polynomial determines how accurate the approximation can be. Higher degree polynomials can achieve higher accuracy but are slower (computationally) to evaluate. There is therefore a tradeoff between accuracy and speed, that depends on the degree N of the approximating polynomial. In a two-step process, once the degree of the polynomial, N, has been chosen, then the best values for the coefficients c are determined.

While an approximating polynomial can be made exact for up to N values of x, it may leave values where the approximation is inexact for other values of x. Therefore, in certain embodiments, it is preferred to find the polynomial with the best "worst case" performance. This best "worst case" polynomial is sometimes referred to as the minimax polynomial—i.e., the polynomial of given degree whose maximum error is the smallest. However, finding the minimax polynomial is a rather complex problem, even though it has been a preoccupation of numerical analysts for many years.

The description below now turns to the methods used to approximate two minimax bivariate functions by generalizing the above to bivariate polynomials. The scaling function, function $f(x, y)$ is approximated by evaluating a bivariate polynomial of degree (N, M):

$$f(x, y) \approx P(x, y) = \sum_{i=0}^{N-1} \sum_{j=0}^{M-1} c_{ij} x^i y^j \quad \text{(Eqn. 5)}$$

As described above, first a degree (i.e. N, M) is chosen and then the coefficients for the approximating polynomial are determined. Furthermore, as stated above, the values of N and M is Eqn. 5 are to be kept small, otherwise there would not be any computational advantages for approximating the scaling functions by using approximating polynomials (e.g. it would take just as long or longer to compute using Eqn. 1).

One method for determining the coefficients is to evaluate the scaling functions (i.e. Eqn. 3) at many points and to solve for the polynomial coefficients by the methods of general linear least squares. An alternate method for determining the coefficients is to use iterative-based methods using a Remez algorithm. Another method for finding the coefficients for a polynomial that is close to the minimax polynomial is by using a Chebyshev approximation. A Chebyshev polynomial $[T_n(x)]$ is defined in the following manner:

$$T_n(x) = \cos(n \cos^{-1}(x)) \quad \text{(Eqn. 6)}$$

Using trigonometric identities, the explicit polynomial representations are:

$T_0 = 1$ $T_1 = x$ $T_2 = 2x^2 - 1$ $T_3 = 4x^3 - 3x$ $T_n = 2xT_{n-1} - T_{n-2}, n \geq 2 \quad \text{(Eqn. 7)}$ The Chebyshev polynomials are defined on the domain $[-1 \ldots 1]$, where they oscillate much like sine waves, with a range of $[-1 \ldots 1]$. The Chebyshev polynomial $T_n(x)$ has n zeros at:

$$x_k = \cos\left(\frac{\pi\left(k - \frac{1}{2}\right)}{n}\right), k = 1, 2, \ldots n \quad \text{(Eqn. 8)}$$

For any function $f$ defined on the interval $[-1 \ldots 1]$, an approximation built from the Chebyshev polynomials that is exact at all of the N zeros of $T_N(x)$ is found, such that:

$$f(x) \approx P(x) = \left[\sum_{i=0}^{N-1} c_i T_i(x)\right] - \frac{c_0}{2} \quad \text{(Eqn. 9)}$$

where the coefficients c are formed from $f$ and the zeros of $T_N(x)$ in the following way:

$$c_i = \frac{2}{N} \sum_{j=1}^{N} f(x_j) T_i(x_j) \quad \text{(Eqn. 10)}$$

The Chebyshev approximation works in the following way. First, using (Eqn. 9) and (Eqn. 10), the Chebyshev approximation of the scaling function $f$ for some large values of N are generated. For the purposes herein, N=32 proves to be enough, since it gives an approximation that is exact at all N zeros of $T_N(x)$ Then the sum is truncated to some M much smaller than N. If the scaling function $f$ is smooth and well behaved, then the truncated sum will be very close to the minimax polynomial of degree M. This truncated sum works well because, for smooth and well behaved functions the coefficients c decrease very rapidly, so that the higher degree terms can be ignored with little loss of accuracy. When they (higher order terms) are chopped off, they become a measure of the error of the approximation. Because the Chebyshev polynomials oscillate like sine waves, this error tends to wiggle uniformly (and closely) about zero. All of the "bad spots" in the approximation have about the same small error, which is a desired feature for the polynomial approximation.

Finally, since it is desired to approximate bivariate functions, a generalization of the approximations stated in (Eqn. 9) and (Eqn. 10) is:

$$f(x, y) \approx P(x, y) = \sum_{i=0}^{N-1} \sum_{j=0}^{M-1} c_{ij} T_i(x) T_j(y) - \frac{1}{2} \sum_{i=1}^{N-1} c_{0i} T_i(x) - \frac{1}{2} \sum_{i=1}^{M-1} c_{i0} T_i(y) - \frac{3}{4} c_{00} \quad \text{(Eqn. 11)}$$

where the coefficients c are formed in the following way:

$$c_{ij} = \sum_{k=0}^{N-1} \sum_{l=0}^{N-1} f(x_k, x_l) T_i(x_k) T_j(x_l) \quad \text{(Eqn. 12)}$$

Now to determine, the order (N, M) of the polynomial, the approximating polynomial (Eqn. 11) is calculated for various degrees (N, M) and its error is measured (with respect to the scale functions in Eqn. 9). The error is measured by checking the approximations at many points and finding the maximum error. The results of this approach which have been carried out for several tens of thousands of random points, are summarized below in Table 1. This table (Table 1) shows the maximum error for each polynomial that approximates the scaling function.

TABLE 1

Error of Degree (N, M) Approximation

|       | M = 2    | M = 3    | M = 4    | M = 5    | M = 6    |
|-------|----------|----------|----------|----------|----------|
| N = 2 | .10927859 | .02153335 | .01454472 | .01424960 | .01425153 |
| N = 3 | .10927007 | .01411494 | .00272421 | .00213571 | .00211595 |
| N = 4 | .10922394 | .01446707 | .00149489 | .00038519 | .00032485 |
| N = 5 | .10920927 | .01456771 | .00141408 | .00014173 | .00005224 |
| N = 6 | .10920564 | .01458300 | .00140275 | .00011094 | .00001327 |

It can be seen from this table that there is little or no gain in accuracy when setting N>M, or M>N+1. This table also shows that the best approximations have M=N+1. The measured error becomes small enough for skeletal animation when N and M are about 4. The polynomial of degree (4, 5) is particularly attractive because it is quite accurate and is a good fit with Single-Instruction Stream Multiple-Data Stream (SIMD) architectures that process floating point operations 2 or 4 at a time. SIMD architectures are essential in parallel computers. Their (SIMD) ability to manipulate large vectors and matrices in minimal time has created a phenomenal demand in such areas as weather data, cancer radiation research as well as computer-based animations. The method described above for determining the degree and coefficients of approximating polynomials is extendible to other scenarios including animation scenarios where polynomials of other degrees would be more suitable. The choice of order (N, M) is dependent on the tradeoff between speed and the level of accuracy, as well as the particular scenario requiring quaternion interpolation.

Embodiments of the methods described above may be implemented as a software program. Such a software program may be written using a variety of programming languages, including C, C++, visual C, Java, visual Java, and other languages as is known to those of skill in the art of interactive entertainment programming.

A non-fully optimized software program using the polynomial-based approximations to the scaling functions for the Slerp function according to embodiments of the present invention, executes approximately 4 times faster than the standard Slerp function. This increase in speed is significant considering the number of quaternion interpolations that a typical game uses are in excess of thousands per frame.

Embodiments of the methods described above may be practiced in a multitude of different ways (i.e., software, hardware, or a combination of both) and in a variety of systems. In one embodiment, the described method can be implemented as a software program. The software program may be configured for execution by various computer systems or processors, including common computer entertainment systems (e.g. PlayStation™ series of game consoles, Nintendo™ series of game consoles including the Game Boy™ products) as well as personal computers (e.g. PC's and Macs).

Figure 2A:
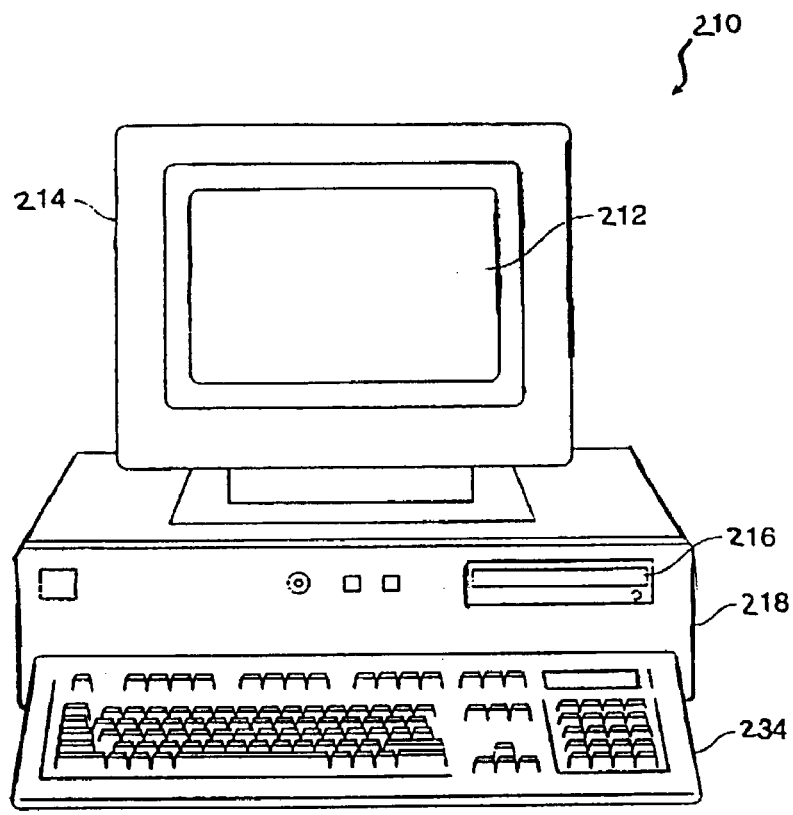
FIG. 2A is diagram of one embodiment of a computer system for executing a software program incorporating the described method for obtaining an interpolated quaternion in accordance with the present invention.

FIG. 2A illustrates an example of a computer system 210 for executing a software program designed to perform each of the described methods. Computer system 210 includes a monitor 214, screen 212, cabinet 218, and keyboard 234. A mouse, light pen, a joy stick, a gamepad, a wheel or other I/O interfaces, such as virtual reality interfaces may also be included (not shown) for providing I/O commands. Cabinet 218 houses a CD-ROM drive 216, a hard drive (not shown) or other storage data mediums which may be utilized to store and retrieve digital data and software programs incorporating the present method, and the like. Although CD-ROM 216 is shown as the removable media, other removable tangible media including floppy disks, tape, flash memory, or game cartridges may be utilized. Cabinet 218 also houses familiar computer components (not shown) such as a processor, memory, and the like.

Figure 2B:
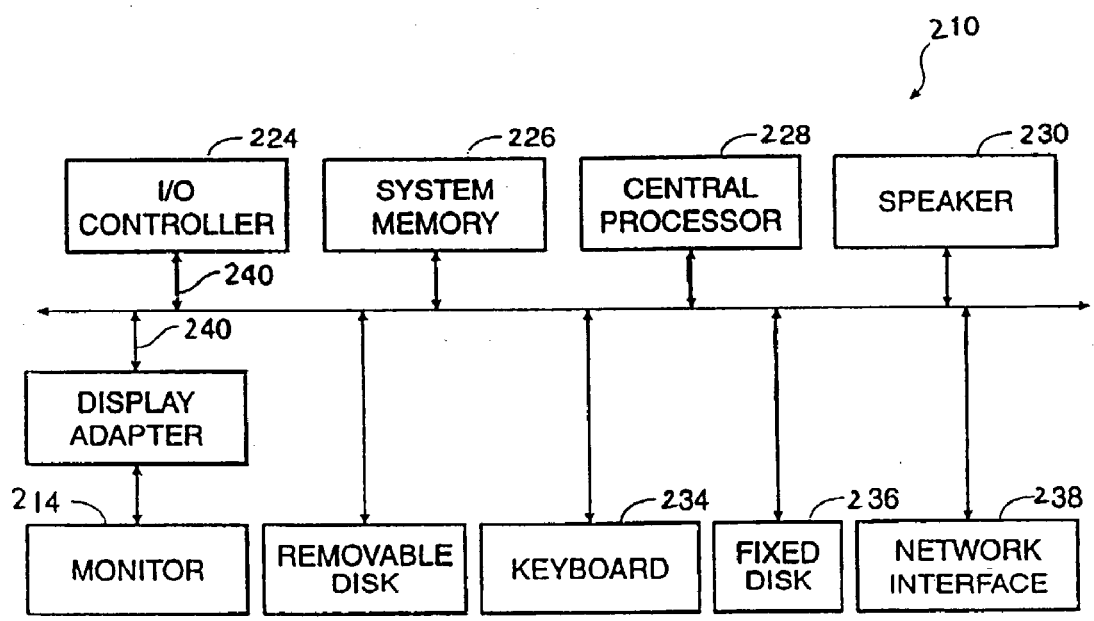
FIG. 2B is a simplified system block diagram of a typical computer system used to execute a software program incorporating the described method for obtaining an interpolated quaternion in accordance with the present invention.

FIG. 2B illustrates a simplified system block diagram of a typical computer system 210 used to execute a software program incorporating the described method. As shown in FIGS. 2A and 2B, computer system 210 includes monitor 214 which optionally is interactive with the I/O controller 224. Computer system 210 further includes subsystems such as system memory 226, central processor 228, speaker 230, removable disk 232, keyboard 234, fixed disk 236, and network interface 238. Other computer systems suitable for use with the described method may include additional or fewer subsystems. For example, another computer system could include more than one processor 228 (i.e., a multi-processor system) for processing the digital data. Arrows such as 240 represent the system bus architecture of computer system 210. However, these arrows 240 are illustrative of any interconnection scheme serving to link the subsystems. For example, a local bus could be utilized to connect the central processor 228 to the system memory 226. Computer system 210 shown in FIG. 2B is but an example of a computer system suitable for use with the present invention. Other configurations of subsystems suitable for use with the present invention will be readily apparent to one of ordinary skill in the art. These other systems include common computer entertainment systems (e.g. PlayStation™ series of game consoles, Nintendo™ series of game consoles including the Game Boy™ products) as well as personal computers (e.g. PC's and Macs).

Embodiments of the present invention offer several advantages as compared to making calls to standard Slerp functions. First, as described above are the advantages gained by speeding up the turn around time for making quaternion interpolations.

Additionally, the embodiments of the present invention, provide the basis for further speeding up the turn around time for making quaternion interpolations, when many interpolations are required for quaternions having the same t's and/or c's (i.e. input to the scaling functions). In such a case, the part of the scaling functions that depend on the fixed input (i.e. t or c) can be precalculated, thus reducing the overall turn around time by approximately 75%. A most common example is when t is fixed, for example, when interpolating all the joint rotations in a human figure from one pose to another, where t remains fixed, and the calculation can then be sped up by precalculating all the coefficient that depend on the fixed t. This further optimization is possible due to the nature of the polynomial evaluations. A call to a standard Slerp function is typically made when blending two character poses together. This usually means that for many consecutive calls to Slerp, the value of t doesn't change. The polynomial-based method in accordance with embodiments of the present invention, enables the reuse of most of the calculation. Alternately, the quaternions evaluations may be arranged so that powers of c are computed first. This would allow for an optimization for the case where c is constant over several calls, which would occur in a character skinning renderer, where many vertices blend the same bones. These optimizations are not possible when calling a standard Slerp function.

Furthermore, the embodiments of the present invention, provide an accurate approximation to the Slerp function that is much faster to compute. It is more easily optimized and can fully exploit vector processors for very fast performance. The method is fast enough to be used for character skinning as well as in an advanced animation engine, because, in part, there is no need to be concerned about the cost of interpolating quaternions.

As will be understood by those of skill in the art, the present invention may be embodied in other specific forms without departing from the essential characteristics thereof. For example, the approximating polynomials may be evaluated at any order leading to an acceptable level of estimation error, or that polynomials other then the Chebyshev polynomial may be used to approximate the scaling functions. Accordingly, the foregoing is intended to be illustrative, but not limiting of the scope of the invention, which is set forth in the following claims.

What is claimed is:

1. A computer-implemented method for performing animation with interpolation, comprising:
   forming a first product of a first quaternion and a first scaling function;
   forming a second product of a second quaternion and a second scaling function; and
   forming a sum of said first product and said second product,
   wherein said first scaling function is approximated by obtaining a first polynomial having at least two variables that is an approximation of said first scaling function,
   wherein said second scaling function is approximated by obtaining a second polynomial having at least two variables that is an approximation of said second scaling function, thus obtaining an interpolated quaternion that is in between said first quaternion and said second quaternion; and
   carrying out computer-generated animation based on the obtained interpolated quaternion.

2. The computer-implemented method of claim 1 wherein said obtaining said first and said second polynomials includes obtaining bivariate polynomials that approximate the respective first and second scaling functions.

3. The computer-implemented method of claim 1 wherein said obtaining said first and said second polynomials include obtaining approximations of a first and a second minimax bivariate polynomials, wherein a minimax polynomial is a polynomial of a given degree whose maximum error is the smallest.

4. A computer-implemented method for performing animation with interpolation, comprising:
   forming a first product of a first quaternion and a first scaling function;
   forming a second product of a second quaternion and a second scaling function; and
   forming a sum of said first product and said second product,
   wherein said first scaling function is approximated by obtaining a first polynomial that is an approximation of said first scaling function,
   wherein said second scaling function is approximated by obtaining a second polynomial that is an approximation of said second scaling function, thus obtaining an interpolated quaternion that is in between said first quaternion and said second quaternion; and
   carrying out computer-generated animation based on the obtained interpolated quaternion;
   wherein said obtaining said first and said second polynomials include obtaining approximations of a first and a second minimax bivariate polynomials, wherein a minimax polynomial is a polynomial of a given degree whose maximum error is the smallest; and
   wherein said obtaining said approximations of said first and said second minimax bivariate polynomials comprises obtaining a first and a second Chebyshev polynomial.

5. The computer-implemented method of claim 4 wherein said Chebyshev polynomials are of order N, M, wherein N is less than M.

6. The computer-implemented method of claim 4 wherein said Chebyshev polynomials are of order N, M, wherein M equals N+1.

7. A computer readable device having computer readable code embodied therein, said code embodying instructions for causing a computer to obtain an interpolated quaternion, comprising:
   instructions for forming a first product of a first quaternion and a first scaling function;
   instructions for forming a second product of a second quaternion and a second scaling function;
   instructions for forming a sum of said first product and said second product,
   wherein said first scaling function is approximated by obtaining a first polynomial having at least two variables that is an approximation of said first scaling function,
   wherein said second scaling function is approximated by obtaining a second polynomial having at least two variables that is an approximation of said second scaling function, thus causing a computer to obtain an interpolated quaternion that is in between said first quaternion and said second quaternion; and
   instruction for carrying out computer-generated animation based on the obtained interpolated quaternion.

8. The computer readable device of claim 7 wherein said instructions for obtaining said first and said second polynomials further comprise instructions for obtaining bivariate polynomials that approximate the respective first and second scaling functions.

9. The computer readable device of claim 7 wherein said instructions for obtaining said first and said second polynomials further comprise instructions for obtaining approximations of a first and a second minimax bivariate polynomials, wherein a minimax polynomial is a polynomial of a given degree whose maximum error is the smallest.

10. A computer readable device having computer readable code embodied therein, said code embodying instructions for causing a computer to obtain an interpolated quaternion, comprising:

instructions for forming a first product of a first quaternion and a first scaling function;

instructions for forming a second product of a second quaternion and a second scaling function;

instructions for forming a sum of said first product and said second product, wherein said first scaling function is approximated by obtaining a first polynomial that is an approximation of said first scaling function, wherein said second scaling function is approximated by obtaining a second polynomial that is an approximation of said second scaling function, thus causing a computer to obtain an interpolated quaternion that is in between said first quaternion and said second quaternion, wherein said instructions for obtaining said first and said second polynomials further comprise instructions for obtaining approximations of a first and a second minimax bivariate polynomials, wherein a minimax polynomial is a polynomial of a given degree whose maximum error is the smallest, and wherein said instructions for obtaining said approximations of said first and said second minimax bivariate polynomials further comprise instructions for obtaining a first and a second Chebyshev polynomial; and instruction for carrying out computer-generated animation based on the obtained interpolated quaternion.

11. The computer readable device of claim 10 wherein said Chebyshev polynomials are of order N, M, wherein N is less than M.

12. The computer readable device of claim 10 wherein said Chebyshev polynomials are of order N, M, wherein M equals N+1.

13. A system for performing animation with interpolation, comprising:

memory for storing code; and at least one processor, wherein said processor operates in response to said code to:

form a first product of a first quaternion and a first scaling function, wherein said first scaling function is approximated by obtaining a first polynomial having at least two variables that is an approximation of said first scaling function, form a second product of a second quaternion and a second scaling function, wherein said second scaling function is approximated by obtaining a second polynomial having at least two variables that is an approximation of said second scaling function, form a sum of said first product and said second product, thus obtaining an interpolated quaternion that is in between said first quaternion and said second quaternion, and carry out computer-generated animation based on the obtained interpolated quaternion.

14. The system of claim 13, further comprising a display that displays animation based on the obtained interpolated quaternion.

* * * * *